US006296774B1

(12) United States Patent
Henkel et al.

(10) Patent No.: US 6,296,774 B1
(45) Date of Patent: Oct. 2, 2001

(54) CENTRIFUGE LOAD CONTROL FOR AUTOMATIC INFEED GATE ADJUSTMENT

(75) Inventors: Donald John Henkel, Loveland; David John Tack, Middletown, both of OH (US)

(73) Assignee: The Western States Machine Company, Hamilton, OH (US)

( * ) Notice: Subject to any disclaimer, the term of this patent is extended or adjusted under 35 U.S.C. 154(b) by 0 days.

(21) Appl. No.: 09/482,694

(22) Filed: Jan. 13, 2000

Related U.S. Application Data

(60) Provisional application No. 60/117,980, filed on Jan. 29, 1999.

(51) Int. Cl.[7] .................................................. B01D 17/038

(52) U.S. Cl. ............................ 210/744; 210/86; 210/781; 210/787; 494/10

(58) Field of Search ................................. 210/86, 87, 97, 210/103, 105, 143, 360.1, 380.1, 739, 744, 787, 512.1; 494/1, 10

(56) References Cited

U.S. PATENT DOCUMENTS

| | | | |
|---|---|---|---|
| 2,727,630 | 12/1955 | Hertrich . | |
| 3,011,641 | 12/1961 | Huser . | |
| 3,079,046 | 2/1963 | Goodwin . | |
| 3,141,846 | 7/1964 | Laven, Jr. . | |
| 3,420,374 | 1/1969 | Umeda . | |
| 3,446,431 | 5/1969 | Marchal et al. . | |
| 3,559,808 | 2/1971 | O'Conor et al. . | |
| 4,229,298 | 10/1980 | Bange . | |
| 4,437,332 | 3/1984 | Pittaro . | |
| 4,522,068 | 6/1985 | Smith . | |
| 4,836,934 | 6/1989 | Homer . | |
| 4,888,989 | 12/1989 | Homer . | |
| 5,009,104 | 4/1991 | Johnson . | |
| 5,040,419 | 8/1991 | Allaire et al. . | |
| 5,044,092 | 9/1991 | Journet et al. . | |
| 5,052,227 | 10/1991 | Le Floc'H et al. . | |
| 5,093,010 | 3/1992 | Schilp . | |
| 5,166,910 | 11/1992 | Batzle et al. . | |
| 5,253,529 | 10/1993 | Lenormand et al. . | |
| 5,254,241 | 10/1993 | Bange et al. . | |
| 5,601,704 | 2/1997 | Salem et al. . | |
| 5,897,786 | 4/1999 | Henkel et al. . | |
| 5,900,156 * | 5/1999 | Zeigler | 210/744 |
| 6,063,292 * | 5/2000 | Leung | 210/739 |

FOREIGN PATENT DOCUMENTS

| | | |
|---|---|---|
| 0 894 814 | 1/1999 | (EP) . |
| 59-92344 | 5/1984 | (JP) . |

* cited by examiner

*Primary Examiner*—Joseph W. Drodge
(74) *Attorney, Agent, or Firm*—Killworth, Gottman, Hagan & Schaeff, L.L.P.

(57) ABSTRACT

A method is provided to automatically control an infeed gate of a centrifuge to regulate the rate of incoming charge and thereby maintain a desired building rate for a charge wall being formed along inner sidewalls of a rotating centrifugal basket by measuring the charge wall thickness which forms, determining a fill rate at which the charge material enters the basket, and comparing the determined rate to a desired fill rate. Closure of the infeed gate is also controlled to gradually approach a minimum flow rate. A method is also provided for sensing an unstabilizing wobble of the centrifugal basket and closing the infeed gate in response. The automatic control of the opening and closing of the gate not only improves the capacity of the centrifuge, but also allows for remote operation.

68 Claims, 7 Drawing Sheets

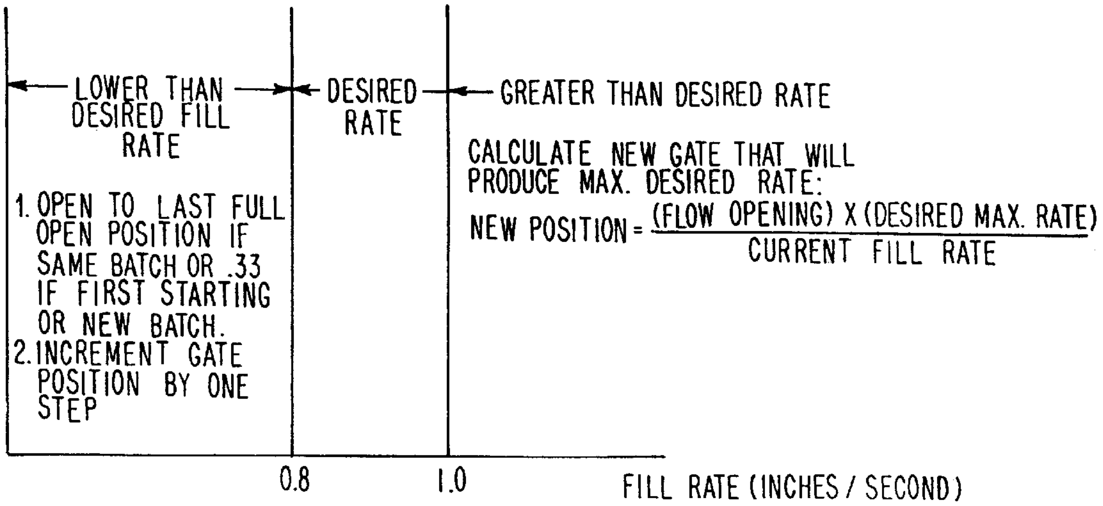
FIG. 5
| GATE POSITION | % FLOW OPENING KNIFE GATE | % FLOW OPENING BUTTERFLY GATE |
|---|---|---|
| 0 | 0 | 0 |
| 1 | 0 | 0 |
| 2 | 5 | 1 |
| 3 | 12 | 2 |
| 4 | 19 | 4 |
| 5 | 26 | 6 |
| 6 | 35 | 8 |
| 7 | 39 | 12 |
| 8 | 46 | 18 |
| 9 | 52 | 25 |
| 10 | 59 | 35 |
| 11 | 62 | 47 |
| 12 | 68 | 60 |
| 13 | 72 | 73 |
| 14 | 79 | 85 |
| 15 | 90 | 93 |
| 16 | 100 | 100 |
| 17 | 100 | 100 |
FIG. 6
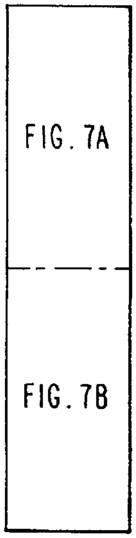
FIG. 7C

| %FLOW OPENING | GATE POSITION KNIFE GATE | GATE POSITION BUTTERFLY GATE |
|---|---|---|
| 0 | 0 | 0 |
| 1 | 0 | 2 |
| 2 | 0 | 3 |
| 3 | 0 | 3 |
| 4 | 2 | 4 |
| 5 | 2 | 4 |
| 6 | 2 | 5 |
| 7 | 2 | 5 |
| 8 | 2 | 6 |
| 9 | 3 | 6 |
| 10 | 3 | 6 |
| 11 | 3 | 7 |
| 12 | 3 | 7 |
| 13 | 3 | 7 |
| 14 | 3 | 7 |
| 15 | 3 | 8 |
| 16 | 4 | 8 |
| 17 | 4 | 8 |
| 18 | 4 | 8 |
| 19 | 4 | 8 |
| 20 | 4 | 8 |
| 21 | 4 | 8 |
| 22 | 4 | 9 |
| 23 | 5 | 9 |
| 24 | 5 | 9 |
| 25 | 5 | 9 |
| 26 | 5 | 9 |
| 27 | 5 | 9 |
| 28 | 5 | 9 |
| 29 | 5 | 9 |
| 30 | 5 | 10 |
| 31 | 5 | 10 |
| 32 | 6 | 10 |
| 33 | 6 | 10 |
| 34 | 6 | 10 |
| 35 | 6 | 10 |
| 36 | 6 | 10 |
| 37 | 7 | 10 |
| 38 | 7 | 10 |
| 39 | 7 | 10 |
| 40 | 7 | 10 |
| 41 | 7 | 10 |
| 42 | 7 | 11 |
| 43 | 8 | 11 |
| 44 | 8 | 11 |
| 45 | 8 | 11 |
| 46 | 8 | 11 |
| 47 | 8 | 11 |
| 48 | 8 | 11 |

FIG. 7A

| | | |
|---|---|---|
| 49 | 8 | 11 |
| 50 | 9 | 11 |
| 51 | 9 | 11 |
| 52 | 9 | 11 |
| 53 | 9 | 11 |
| 54 | 9 | 12 |
| 55 | 9 | 12 |
| 56 | 10 | 12 |
| 57 | 10 | 12 |
| 58 | 10 | 12 |
| 59 | 10 | 12 |
| 60 | 10 | 12 |
| 61 | 11 | 12 |
| 62 | 11 | 12 |
| 63 | 11 | 12 |
| 64 | 11 | 12 |
| 65 | 11 | 12 |
| 66 | 12 | 12 |
| 67 | 12 | 13 |
| 68 | 12 | 13 |
| 69 | 12 | 13 |
| 70 | 12 | 13 |
| 71 | 13 | 13 |
| 72 | 13 | 13 |
| 73 | 13 | 13 |
| 74 | 13 | 13 |
| 75 | 13 | 13 |
| 76 | 13 | 13 |
| 77 | 14 | 13 |
| 78 | 14 | 13 |
| 79 | 14 | 13 |
| 80 | 14 | 14 |
| 81 | 14 | 14 |
| 82 | 14 | 14 |
| 83 | 14 | 14 |
| 84 | 14 | 14 |
| 85 | 14 | 14 |
| 86 | 15 | 14 |
| 87 | 15 | 14 |
| 88 | 15 | 14 |
| 89 | 15 | 14 |
| 90 | 15 | 15 |
| 91 | 15 | 15 |
| 92 | 15 | 15 |
| 93 | 15 | 15 |
| 94 | 15 | 15 |
| 95 | 15 | 15 |
| 96 | 16 | 15 |
| 97 | 16 | 16 |
| 98 | 16 | 16 |
| 99 | 16 | 17 |
| 100 | 17 | 17 |

FIG. 7B

CORRECTION TO FILL_DURING_CLOSING

NOTE: THE MINIMUM UNDERFILL THAT OCCURRED IN THE LAST 3 CYCLES IS USED TO CORRECT FILL_DURING_CLOSING. THREE CONSECUTIVE UNDERFILLS MUST OCCUR BEFORE A CORRECTION IS MADE.
OVERFILLS ARE CORRECTED IMMEDIATELY.

CENTRIFUGE LOAD CONTROL FOR AUTOMATIC INFEED GATE ADJUSTMENT

CROSS-REFERENCE TO RELATED APPLICATIONS

This application claims the benefit of U.S. Provisional Application No. 60/117,980 filed Jan. 29, 1999, which is incorporated herein by reference.

BACKGROUND OF THE INVENTION

The present invention relates in general to heavy cyclical centrifugal machines and, more particularly, to a method for adjusting automatically an infeed gate supplying charge materials to the rotating centrifugal baskets of such machines so as to control the thicknesses of charge walls being formed along the inner sidewalls of the rotating centrifugal baskets. While the present invention is generally applicable to such machines, it will be described herein with reference to heavy cyclical centrifugal machines used for manufacturing and refining sugar.

A problem encountered when operating heavy cyclical centrifugal machines of the type used to manufacture and refine sugar is the inaccurate loading of the centrifugal baskets of the machines. These baskets should be fully loaded to their maximum capacities to maximize the productivity of the machines. Unfortunately, underloading the baskets results in reduced production and, when striving for maximum loading, the baskets are often overloaded so that charge material is lost from the basket resulting in waste even though production is increased. Variations in the loading properties of the charge material, massecuite for sugar manufacture and refining, can effect the efficiency of cycle to cycle centrifugal processing. These variations often occur from one batch of charge material to another and even occur between different portions of a single batch of charge material. Since these variations in loading properties are difficult or impossible to control, it has been an ongoing goal in the industry to control the loading operations of centrifugal machines such that the machines operate with maximum charge in spite of the charge material variations.

To control loading a centrifugal machine, measurements of the volume of the charge as it is being loaded into the machines have been made. For example, mechanical charge wall thickness measuring devices have been used to determine the thickness of the charge wall and thereby the volume of material in the charge basket of a machine, see U.S. Pat. Nos. 2,727,630; 3,011,641; 3,079,046; and, 3,141,846. A capacitance probe has been used also to determine wall thickness and hence the volume of material in the charge basket of a centrifugal machine, see U.S. Pat. No. 4,229,298. The mechanical and capacitance charge wall thickness measuring devices have been used with a variety of loading gates and loading gate control processes.

For example, the loading gate may be progressively closed as the charge measuring device indicates progressively increasing charge thickness in the centrifugal basket. When the charge wall approaches the desired thickness, the loading gate has moved to and is maintained at a pinched or largely closed position. When the final wall thickness is actually reached, the loading gate is quickly closed so that only a limited amount of material can flow into the basket as it closes from its pinched position to its fully closed position. The amount of material entering the basket during final closure of the loading gate from its pinched position to its fully closed position is insufficient to appreciably deviate from the desired final charge volume.

In another gate control process, the loading gate may be closed rapidly from its full open position to a pinched position and thereafter fully closed when the final wall thickness or volume has been reached. In yet another gate control process, the loading gate can be rapidly moved from its full open position to its fully closed position upon sensing the desired final wall thickness.

In still another gate control process which is currently enjoying substantial commercial success, when the charge wall approaches the desired thickness, the loading gate is rapidly moved to a pinched position which is a proportion of a selectable full open position from which it is to be closed, see U.S. Pat. No. 5,254,241 which is incorporated herein by reference. When the final wall thickness is actually reached, the loading gate is quickly closed so that only a limited amount of material can flow into the basket as it closes from its pinched position to its fully closed position.

The variety of loading gate control processes have been implemented, at least in part, to compensate for limitations in the measuring abilities of mechanical and capacitive charge wall thickness measuring devices. As should be expected, mechanical charge wall thickness measuring devices are prone to becoming fouled by the charge materials flowing into a basket of a centrifugal machine. While capacitive charge wall thickness measuring devices are a distinct improvement over mechanical devices, the sensitivity of capacitive devices is proportional to the inverse of the sensing distance so that their resolution is greatly diminished at larger measuring distances.

An ultrasonic probe has also been used to measure the charge wall thickness in a centrifugal machine, see U.S. Pat. No. 5,897,786 for a METHOD AND APPARATUS FOR DETERMINING THICKNESS OF A CHARGE WALL BEING FORMED IN A CENTRIFUGAL MACHINE which is incorporated herein by reference. The ultrasonic probe is mounted in the centrifugal machine within close proximity to a maximum charge wall which is to be formed within a charge basket of the centrifugal machine. The probe comprises a tubular member, which extends from an upper portion of an outer shell which surrounds the basket, into the basket. The probe is positioned to direct bursts of pulses of ultrasonic energy toward the inner surface of the basket and receive reflections or echoes of the pulses which are reflected from the charge wall building within the basket to monitor build up of a charge wall within the basket.

These ultrasonic probes are able to make highly accurate measurements over substantial distances and they are noncontact so that they have no wearing parts. In addition, the ultrasonic probes have highly linear measuring characteristics over their measurement range. The highly linear measuring characteristics of ultrasonic sensors make them ideal for measuring the thickness of a charge wall being formed in a centrifugal machine. Ultrasonic sensors have thus been used to replace mechanical and capacitive charge wall thickness measuring devices to operate gates in centrifugal machines using existing gate control processes. While the ultrasonic probes function admirably in this capacity, unfortunately, the existing gate control processes need to be improved to take full advantage of the ultrasonic probes.

Accordingly, there is a need for improved infeed gate control for supplying charge materials to the rotating centrifugal baskets of centrifugal machines so as to control more accurately and consistently the thicknesses of charge walls being formed along the inner sidewalls of the rotating centrifugal baskets regardless of the many variables which influence operation of such machines including, for example, consistency of the massecuite being used. Preferably, such improved gate control would enable the centrifugal machines to operate substantially independent of operator supervision so that a machine operator does not have to continually be present during operation of the machines.

SUMMARY OF THE INVENTION

The present invention meets this need by automatically controlling an infeed gate to regulate the rate of incoming charge and thereby maintain a desired building rate for a charge wall being formed along inner sidewalls of a rotating centrifugal basket of a centrifugal machine. Closure of the infeed gate is also controlled to gradually approach a minimum flow rate. The automatic control of the opening and closing of the gate not only improves the capacity of the machine but allows the machine to be operated remotely thereby freeing operators from constant surveillance of the machine required in the past.

Other features and advantages of the invention will be apparent from the following description, the accompanying drawings and the appended claims.

BRIEF DESCRIPTION OF THE DRAWINGS

FIG. 5 illustrates different regions of gate control logic for basket loading as a function of the basket fill rate during a non-pinch mode portion of machine loading;

FIG. 6 is a table for converting gate position to % flow rate for a knife gate and a butterfly gate;

FIGS. 7A and 7B assembled as shown in FIG. 7C form a table for converting % flow rate to gate position for a knife gate and a butterfly gate;

DETAILED DESCRIPTION OF THE INVENTION

Figure 1:
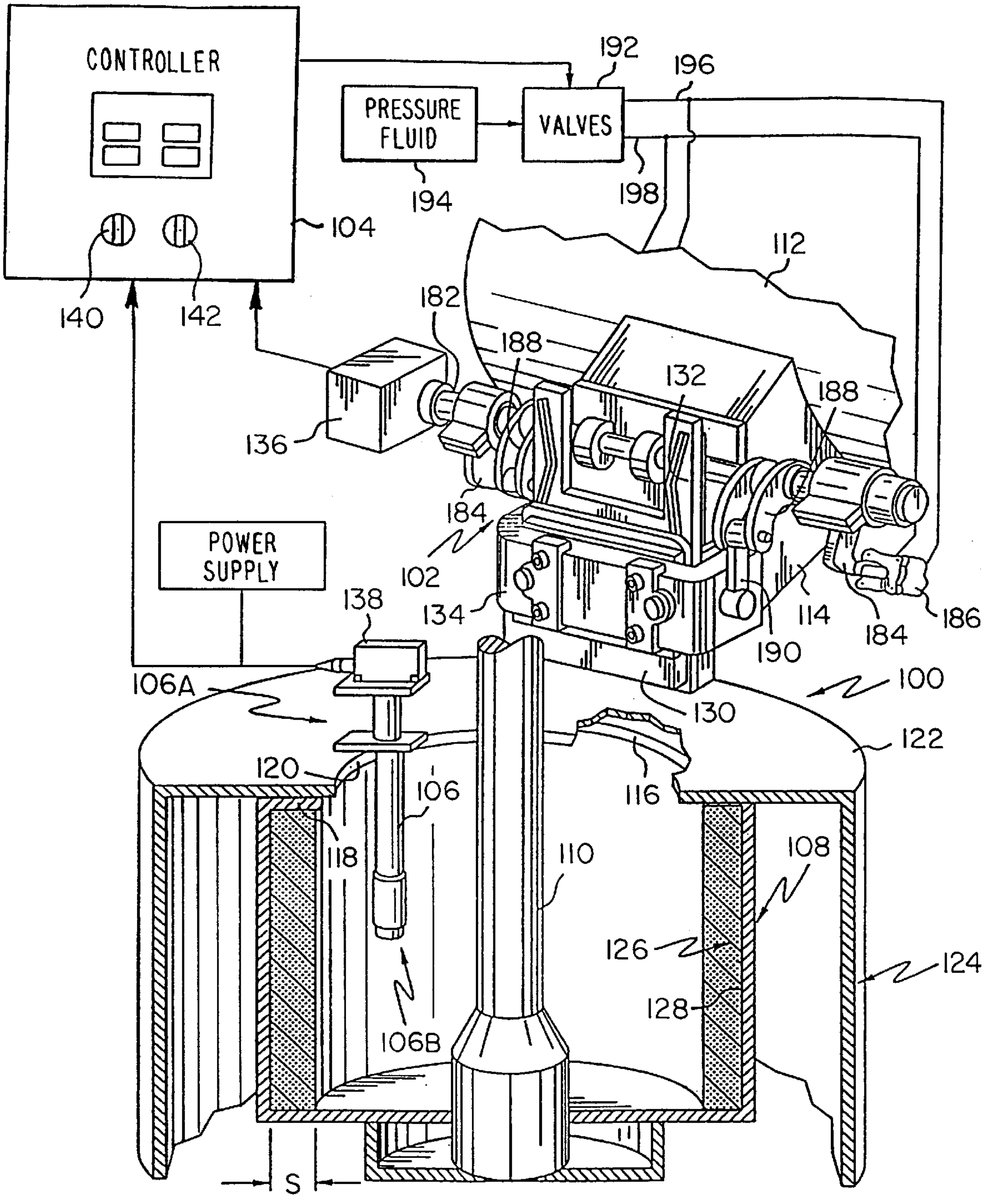
FIG. 1 is a partially sectioned, perspective schematic view of portions of a cyclic centrifugal machine including an ultrasonic probe and an infeed or loading gate for delivering charge material into a basket of the machine to schematically illustrate apparatus operable in accordance with the present invention.

While the present invention is applicable to centrifugal machines in general, it will be described herein with reference to heavy cyclical centrifugal machines used for manufacturing and refining sugar. For example, FIG. 1 schematically illustrates portions of such a heavy cyclical centrifugal machine 100, a loading gate assembly 102 operable in accordance with the present invention and a loading controller 104 operable in response to signals generated by an ultrasonic probe 106 or other means for linearly measuring the charge wall as it builds up in the machine 100. It is noted that a variety of valve constructions can be used in the present invention as the loading or infeed gate including, for example, the knife valve of the illustrated loading gate assembly 102, butterfly valves, and other appropriate valves as will be apparent to those skilled in the art.

The centrifugal machine 100 includes a perforated cylindrical basket 108 carried on a spindle 110 that is suspended from a gyratory head (not shown) for gyratory motion and is rotated in a conventional manner by a rotary prime mover (not shown). The spindle 110 and basket 108 are driven at high centrifuging speeds for processing a load of charge material in the basket 108 and at lower speeds during other operating phases of cyclic machine operation.

Charge material, such as massecuite for sugar manufacture and refining, is delivered into the basket 108 from a storage or supply tank 112 by the loading gate assembly 102 mounted at the mouth of a spout 114 extending from the tank 112. The charge material flowing from the loading gate assembly 102 passes into the basket 108 through a central opening 116 in a top 118 of the basket 108 reaching the basket 108 through a central opening 120 in a top 122 of a cylindrical curb structure including an outer wall 124 which surrounds the basket 108.

The charge material is made up of both solid and liquid components and is delivered into the basket 108 while the basket 108 is rotating at a relatively low speed which is suitable for forming a charge wall 126. The charge wall 126 is formed in a charge space S along an inner sidewall 128 of the basket 108 by centrifugal force. When the charge is centrifuged at higher operating speeds, liquid is expelled from the solids of the charge wall 126 with the liquid passing through screens and perforations (not shown) in the basket 108.

The loading gate assembly 102 includes a movable gate member 130 slidable along its rear face to and from open positions on a facing plate 132 mounted about a mouth of the spout 114. A crosshead member 134 extends across the front face of the gate member 130 to support a rear face of the gate member 130 against the facing plate 132 and to aid in sliding the gate member 130 to and from its open positions as described more particularly in U.S. Pat. No. 2,801,035 which is incorporated herein by reference. In the illustrated embodiment, the gate member 130 has 17 separate positions ranging from fully closed (position 0) to fully open (position 16). The number of such steps can be increased or decreased in number, or control can be substantially continuous. In the illustrated centrifugal machine, it takes approximately 1.1 to 2.0 seconds for the gate member 130 to be moved from its maximum opening to its full closed position; however, in the present invention it is currently preferred to allow approximately 0.8 seconds for movement of the gate member 130 from one position to the next adjacent position to allow time for the flow changes in the material being loaded into the machine 100 due to the changed gate position. While other valves will have different time responses, the 0.8 second time is generally adequate for operation with those valves and, in any event, can be changed if necessary since the 0.8 second time interval is a control input variable.

The controller 104 receives input signals from an encoder 136 and from probe control circuitry within a probe control circuit housing 138 (alternately, the probe control circuitry can be housed within the controller 104) of the ultrasonic probe 106 and also from operator settable controls 140,142 associated with the controller 104. An operator of the centrifugal machine 100 can set an appropriate final thickness for the charge wall 126 to be loaded into the machine 100 by the settable control 140. The settable control 142 can be adjusted to set a gate full open position (Full_Open_Pot_Position) which is appropriate for the charge material being loaded into the machine 100.

The loading gate assembly 102 is normally held tightly closed to prevent charge material from being dispensed from the supply tank 112. The movable gate member 130 is moved to and from open positions by rotation of a gate shaft 182 which is connected through crank arms 184 with fluid pressure cylinders 186 (only one shown, air pressure being used for food applications) that move the arms 184 to turn the shaft 182. Gate member lifting arms 188 mounted on the shaft 182 are connected by links 190 (only one shown) to the crosshead member 134 and thus will move the movable gate member 130 along the facing plate 132 to an open position enabling charge material to flow through the spout 114. Under control of the loading controller 104, valves 192 pass fluid under pressure from a pressurized fluid source 194 via fluid lines 196, 198 to control the opening and closing of the movable gate member 130. An encoder 136, commercially available for example from Kytronics, is coupled to the gate shaft 182 to sense the angular position of the shaft 182 and produce a gate member position signal representing the position of the gate member 130.

In response to signals from the probe control circuitry within the housing 138 and the gate member position signal, the loading controller 104 controls the movable gate member 130. Control of the movable gate member 130 is effected in accordance with the present invention and will be described hereinafter. The loading controller 104 may be embodied in a programmable logic controller (PLC) or in one of a large variety of commercially available microprocessors. For further details regarding the operation and structure of the ultrasonic probe 106, reference should be made to referenced U.S. Pat. No. 5,897,786.

In addition to gate control, by accurately measuring the charge wall thickness, the ultrasonic probe 106 enables automatic adjustment of wash times. Due to varying crystal sizes and different solid/liquid ratios from one batch of massecuite to the next, purge rates vary. Therefore, the amount of solids and the thickness of the charge wall or cake at process revolution speed will vary also. Because a portion of the cake is dissolved by the wash, the amount of wash time is set at an optimum level to perform the purge. Excessive wash time merely wastes product.

Thus, one of the control features afforded by the linear measurement of the ultrasonic probe 106 is to measure the cake thickness just prior to the wash period. By using a look-up table, the wash time is set appropriately by the controller 104 for the particular cake thickness. The controller 104 thus automatically adjusts for different amounts the cake settles during centrifuge processing.

The controller 104 is also configured to measuring the rate of incoming charge material. The manual adjustment of feed rate is presently the primary operation necessitating centrifuges to be continuously monitored. Without an instrumented feed rate measurement arrangement, visual observation is the only method available for feed rate adjustment. This means that a centrifuge operator must continuously be stationed within eyesight of the machines. With an arrangement for automating this function, the machines can be remotely monitored in a centralized location from which the entire factory operations can be monitored. Also the monitoring can be automated, eliminating the need for continuous human attention.

A unique feature of the present invention utilizing the ultrasonic probe 106 is that the feed rate or fill rate as well as the charge wall position is measured. The feed rate is determined as the time rate of change of the charge wall position. The feed rate is calculable because the ultrasonic probe 106 measures the charge wall position linearly and can make accurate far field measurements. This calculation is an added built-in feature of the controller 104. In the illustrated embodiment of the invention, from fill level measurements taken every 30 milliseconds, the controller 104 is programmed to use selected interval measurements to make a rate calculation approximately every 0.8 seconds which, as noted earlier, allows for the response time of the charge material, i.e., the amount of time for a change in the flow rate of the charge material to take effect in response to a change in the position of the gate member 130. The feed rate is then determined by comparing succeeding measurements with each other. Of course, rate calculation time periods other than approximately 0.8 seconds can be used in the present invention.

In the illustrated embodiment, the controller 104 is programmed to adjust the position of the gate member 130 and thus the rate of infeed to maintain a substantially constant feed rate of approximately one inch per second. The feed rate and position of the gate member 130 enable the controller 104 to determine the actual nature of the incoming charge material, particularly its fluidity. Excessively high fluidity usually means adverse centrifuge loading conditions where a lowered feed rate is appropriate.

Some of the consequences of low, and high feed rates, and excessive fluidity will be discussed to illustrate the benefits of feed rate control. If the rate of incoming charge is too low, the charge material purges too quickly and a hyperbolic wall, i.e., a cake thickness being thicker at the bottom of the basket than it is at the top of the basket, results. Regardless of incoming rate, the material first touches the basket at its bottom and then walls upward by centrifugal force. When the rate of incoming charge is too low, the incoming charge purges liquid too fast at the basket bottom; the incoming material loses fluidity, preventing it from flowing upwards to form a straight vertical wall. If the hyperbolic wall keeps its uneven shape at higher process revolution speed, uneven washing occurs since the wash nozzles are configured for a uniform cake thickness. If the hyperbolic wall actually straightens up at higher speed with the excess charge at the basket bottom being forced inwards into the cake, material at the basket top is forced to overflow and be wasted.

On the other hand, a too high incoming feed rate produces an initially excessively fluid cake. During loading, because the liquid portion of the charge cannot be purged quickly enough to keep up with the incoming rate, an excessive amount of fluid accumulates in the charge. Problems thus occur. Loading terminates with a high proportion of liquid and the final amount of dry solid charge material will be considerably less than an otherwise full amount thereby wasting machine capacity. Also the resulting thinner cake wall of solid material may be excessively dissolved away during washing since, conventionally, the wash time period is usually set at a maximum, appropriate for maximum cake capacity. In extreme cases the charge will behave like a body of nonviscous liquid and a “water wall” wave can form. This unbalances the basket, and if not reacted to quickly enough by the operator, a mechanical gyration switch (not shown) is tripped, stopping the machine.

This invention overcomes these difficulties by allowing the rate of charge wall buildup to be selectable by the operator. Upon being alerted by process information of an abnormal solids/liquids ratio, the operator selects a lowered value than the normal default value for the desired rate of charge wall buildup, so that a much improved sugar recovery is achieved and the accumulation of liquid inside the centrifuge is discouraged.

Sometimes due to faulty massecuite preparation the incoming material is excessively liquid and the crystal size is abnormally small. The crystals, being too small, compact too much tending to bind the filter screen. The liquid cannot filter out rapidly enough and the charge becomes excessively liquid again causing a potentially dangerous water wall to form such that the normal incoming feed rate should not be maintained. In most plants not processing the material is not an option, and without automatic control, processing depends on an alert centrifuge operator to cut back the feed rate by adjusting the feed gate to a less open position. Should a water wall develop, the cake wall will momentarily be moving away from, instead of towards, the sensor. This happens as the surface wave passes the ultrasonic sensor.

Under normal conditions a calculated feed rate based on input signals from the probe 106 is always a numerically positive value. However, with the just described situation with a water wall, the apparent feed rate will be reduced momentarily each time the water wall wave passes the ultrasonic sensor so that the rate oscillates. Such reductions in the apparent feed rate can be used to generate an apparent negative feed rate, as will be described, to trigger the controller 104 to close the gate member 130 to a less open position until the occurrence of such feed rates ceases. Thus, the feed rate is automatically adjusted to allow the available purge rate to rid the centrifuge of excess liquid and to avert a dangerous situation. If the crystals are so compacted that there is no filtration, and the water wall persists, the infeed gate is continually moved to more closed positions until it is completely shut.

During a period of excessive basket oscillation due to a water wall or wave, the oscillation frequency will be approximately 70% of the basket rotation speed resulting in an oscillation frequency of from about 0.8 hertz to about 2.3 hertz. A sample time rate of approximately one reading per 60 milliseconds can be used to capture the wave form of the passing water wall in this frequency range. A data recording period of 1.2 seconds can be used to capture 1 oscillation cycle at the lowest frequency of 0.8 hertz.

Figure 11A:
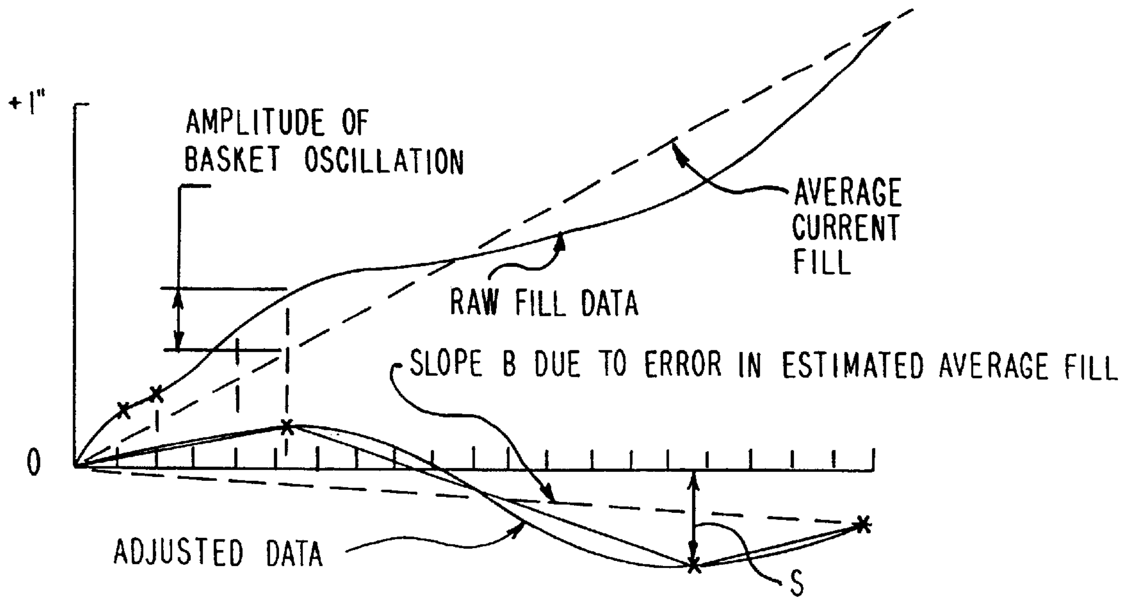
Figure 11B:
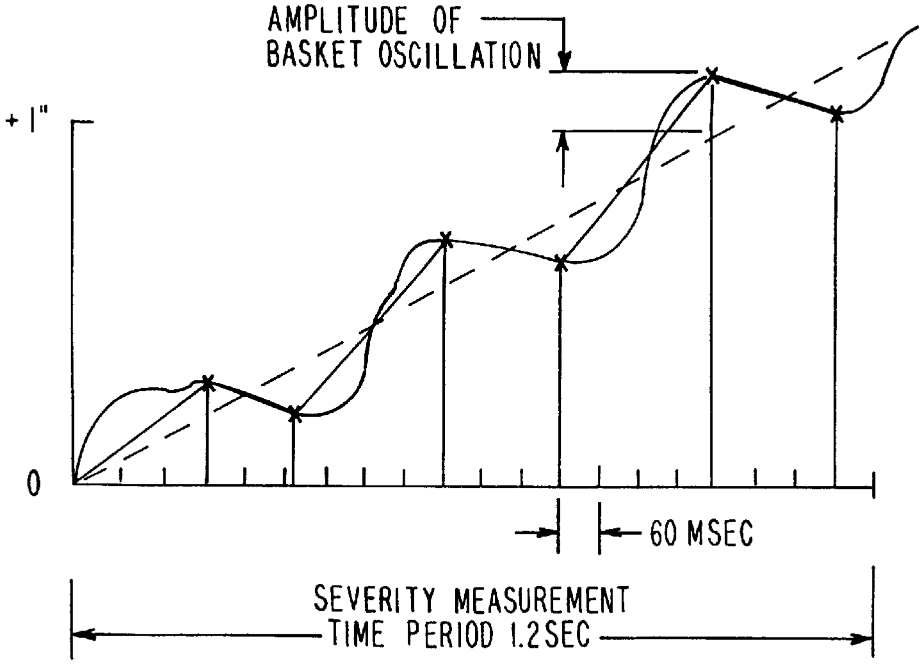

In FIGS. 11A and 11B, the curved lines illustrate the fill level accumulation with the same amount of amplitude of oscillation of the basket. The curves ramp upward because the basket is filling. The difference in FIGS. 11A and 11B is due to the basket oscillation frequency. FIG. 11A shows a basket oscillation at the frequency of 0.8 hertz and FIG. 11B shows a basket oscillation at the frequency of 2.3 hertz with fill level data being taken every 60 msec. In FIG. 11A, there is no apparent negative fill rate, i.e., from the raw data, the fill values are always ascending because the average rate of fill, shown by the dotted line in FIG. 11B, is so high. Therefore, to assure the existence of apparent negative fill rates when basket oscillation occurs, the estimated current average fill is subtracted from each fill data value to obtain adjusted fill value. The most recent fill rate, which is determined every 0.8 seconds times, multiplied by the number of time increments of 60 milliseconds each, corresponds to the fill data point and serves as the estimated current average fill value. The adjusted data is shown as the lower curve on FIG. 11A. The value of the distance S, see FIG. 11A, cannot be used as the value of the amplitude of oscillation, because it is influenced too much by the error in the estimated current average fill value, i.e. the slope B showing the adjusted data average on FIG. 11A would be equal to zero, if the exact average current fill could have been subtracted. To remove the affect of the average of the adjusted data not being zero, the following algorithm is used. Straight lines connecting the point of a transition between ascending data fill values and descending data fill values illustrates the oscillations in apparent feed rates. (The slope of each straight line is an apparent fill rate.) An apparent fill rate for each straight line is simply the change in the fill divided by the number of 60 msec. time increments; the apparent fill rates will have positive values alternating with negative values. By taking a summation of the absolute values of these apparent feed rates and dividing by the number of peaks occurring in the data recording period (of 1.2 seconds), a severity rating is produced. In this example, the existence of excessive basket oscillation is indicated by a severity measurement of 50, based on a scale of 0 to 4096 for full charge wall depth, which corresponds to a peak-to-peak swing of the basket of ⅜ inch.

Typically, the basket will swing away from the gate due to the initial impact of the incoming charge producing a basket wobble. Also initially the charge wall delays in climbing the basket wall and the charge climbs upward with a sudden change in wall thickness which is not necessarily uniform about the circumference of the basket. This is seen by the controller as a wobble. Therefore, lowering the gate is not allowed, until the basket is filled to a minimum fill level threshold or minimum load level. Also, before the gate is lowered, the oscillation must persist for a duration of time and therefore the results of two sample periods are used.

Once the oscillation has persisted for the required duration above a severity threshold level, such as the severity measurement of 50 described above, the gate flow opening is lowered 20%. The conversion of the gate position to a flow opening upon which the 20% calculation is made and the conversion of the new gate flow opening to a new gate position is done using the look-up tables of FIGS. 6 and 7 as discussed later herein. In a working embodiment, the gate position is always lowered by at least one gate position even if the 20% gate flow opening reduction would indicate that no gate position change is needed. Of course, after it has been confirmed that the gate is at its new commanded position, the wobble detector feature is once again active and the gate can be lowered further, if excessive oscillation persists.

In addition, a wobble severity count, which totals the number of consecutive occurrences of gate position closure due to detected wobble, is maintained and compared to a maximum severity count. The maximum severity count may be set to a selected number, for example 5 in a working embodiment. If the selected maximum severity count is exceeded, the gate is fully closed, the speed of the rotational basket is lowered, and an alarm is triggered.

Basket oscillation can also be caused by an unbalance such as a lump of solid charge or the existence of a "rat hole" due to a leak in the screen. These situations, where the automatic lowering of the gate is a nuisance, require operator attention. The wobble detector is disabled for the loading cycle once the operator changes the maximum allowed gate opening.

When an unbalance has forced termination of loading, whether due to a water wall occurrence or due to a chunk of solidified massecuite entering the centrifuge, it is desirable to slow the revolution speed to diminish the amplitude of basket oscillation. Enough revolution speed is maintained to keep the bulk of charge in a walled up position. Without automatic control an operator applies the brakes momentarily lowering speed, and then cautiously adds charge to allow the load to balance out.

Having the mechanical gyration switch trip or pressing the emergency stop button is not desired, since these stop the machine entirely. The charge is no longer fluid and once the machine is stopped, the charge falls to the bottom of the basket where it will remain. It will not wall up once the basket rotates again and, being unevenly distributed, an even larger unbalance prevents basket rotation at loading speed. Being unprocessed product, it cannot be discharged. It must be manually removed usually by hosing with water to dissolve it away.

By monitoring the occurrence of negative apparent feed rates as previously described, the ultrasonic sensor monitors basket gyration. The amplitude of these values are used as an indication of the severity of oscillation. If the oscillation severity is too high, above a set point, or too persistent after the gate has shut, the revolution speed is lowered and an alarm is triggered.

For routine, normal loading cycles, there are three objectives for automatic control of the infeed gate opening, i.e., the position of the gate member 130. The first objective is to regulate the rate of charge wall build up, for example 1"/sec. The second objective is to have the rate of incoming charge material approach a minimum flow rate as the fill approaches the desired amount of fill. The third objective is to have the final amount of load in the basket correspond to the desired amount of load or final wall thickness as set by the operator by the control 140.

The first objective utilizes the ultrasonic probe's 106 ability to measure the amount of fill in the basket 108 so that the filling rate can be calculated by the controller 104 as described above. The filling rate is used by the controller 104 to either hold the gate member 130 at its current position or to increase or decrease the position of the gate member 130. Constant monitoring by an operator is thus no longer necessary once the fill rate is automatically controlled by the controller 104.

The second objective makes it possible to load the basket 108 with the desired amount of charge material more accurately. This action is similar to the instinctive technique of filling a glass to its rim with water. The rate of filling is reduced as the fill level reaches the rim. Purge time thus increases allowing the charge wall to contract further than otherwise possible. Extra room for additional charge is thus provided in the basket 108 thereby increasing capacity of the machine 100.

The third objective is achieved by a program in the controller 104 that is initiated once the gate member 130 begins to shut. The controller 104 monitors the occurrence of under-loading or underfill and over-loading overfill and adjusts the gate member 130 closure trip-point, sometimes referred to as the fill at shut (Fill_At_Shut) level. The operator is thus free of the burden of adjusting the closure trip point to achieve full capacity without overloading.

The controller 104 is programmed to control the opening or position of the gate member 130 so as to control the thickness of the charge wall being formed along the inner sidewalls of the rotating centrifugal baskets. The following process will be described with respect to a standard 7" basket even through the process is generic for any size basket. The thickness of the charge wall is measured by the ultrasonic probe 106 every 30 milliseconds. The control circuitry of the ultrasonic probe 106 is calibrated to transmit an analog current which is proportional to the thickness of the charge wall or load material and ranges from 20 mA when the basket 108 is empty to 4 mA when the basket is fully loaded with a maximum charge. The decreasing current signal for increasing basket charge is a fail safe arrangement in that for a system or power failure during loading, the loading controller 104 receives a current signal indicating that the basket is fully loaded and immediately closes the loading gate assembly 102. The probe control circuitry within the housing 138 is commercially available from Hyde Park Electronics, Inc. of Dayton, Ohio.

Figure 2:
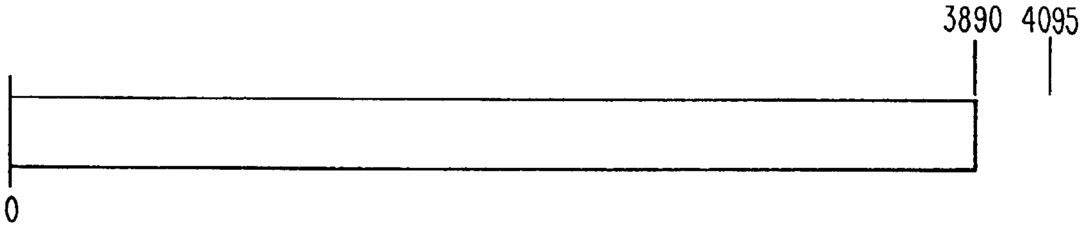
FIG. 2 is a graphic representation of the range of basket fill and a typical fill level request for the illustrated embodiment.

In the illustrated embodiment, a current value of 4 mA corresponds to maximum possible loading of the basket 108 and is set at a convenient value of 4095 . A current value of 20 mA corresponds to an empty basket 108 and is set at a convenient value of 0. The current readings form the control circuitry are thus converted to values ranging from 0 to 4095 . In the illustrated embodiment, a value of 3890 corresponds to the desired thickness of charge material, 7" for a 7" basket. A value of 4095 corresponds to an overloaded basket at 7.37" . FIG. 2 illustrates the buildup of the charge wall within the basket 108. The desired thickness of the charge wall is thus 3890 or 7" for a 7" basket.

Figure 3:
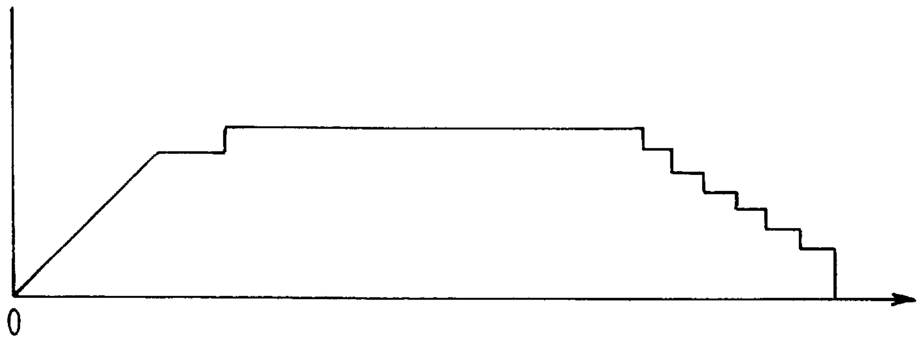
FIG. 3 is a graphic representation of the actual fill rate of a basket when the gate is controlled in accordance with the present invention.
Figure 4:
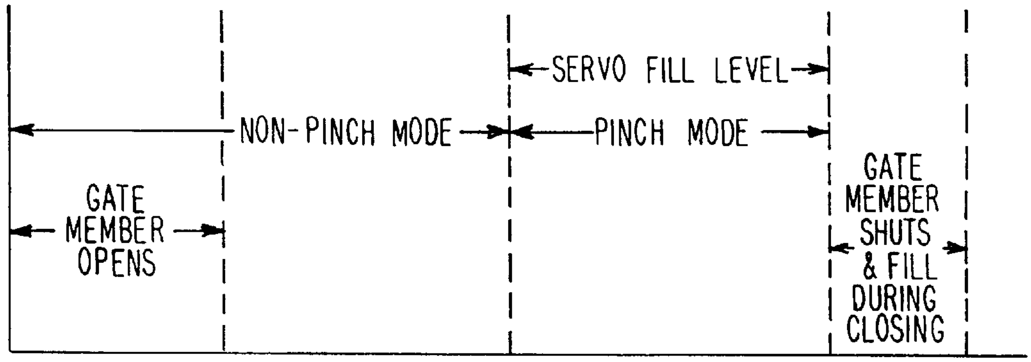
FIG. 4 illustrates control modes to achieve fill rate control of FIG. 3.

FIG. 3 illustrates the fill rate of the basket 108 over time as controlled by the present invention to yield the desired thickness of the charge wall shown in FIG. 2. As shown in FIG. 4, the fill rate is set to operate in two modes of operation: non-pinch mode (Non_Pinch_Mode) and pinch mode (Pinch_Mode). As described above, pinch mode corresponds to gradual closing of the gate member 130 as the desired thickness of the charge wall is approached. It should be apparent from FIGS. 2–4 that the thickness of the charge wall increases somewhat once the gate member 130 is completely closed. Accordingly, the point in time of the centrifuging process at which to close the gate member 130 must be controlled to ensure that the desired wall thickness is achieved. If the actual thickness of the cake or charge wall is greater than the desired thickness set by the control 140, the gate member 130 needs to be closed earlier and if the wall thickness is less than the desired thickness, the gate member 130 needs to be closed later.

Non-pinch mode operation corresponds to the period in which the gate member 130 opening or flow rate is driven to the maximum fill rate. The non-pinch mode also includes the time period required for the gate member 130 to open. The time it takes to open the gate member 130 to the maximum fill rate depends on a number of factors, e.g., the size of the basket, the consistency of charge material, and whether a new batch of charge material is being used, a so-called new strike. However, on average, it will take approximately 1 to 4 seconds, depending on the amount of opening required, for the gate member 130 to open to the maximum fill rate for a 7" basket. In the illustrated embodiment, when a new strike or new batch of charge material is being used, potentially changing the material characteristics and the head in the holding tank 112, or when the machine 100 is being used for the first time during that operating period, the load control is reset by the operator.

A programmable logic controller (PLC) could reset the load control every loading cycle to entirely eliminate the need for operator intervention. However, since the addition of charge to the holding tank is a non-automated function inherently involving an operator, the requirement to reset a battery of centrifuges is not a cost penalty. The reset establishes a temporary position to which the gate will initially open. The presently preferred temporary position corresponds to a flow opening of approximately 15% of the flow that would occur if the gate were open to its maximum extent. Once the temporary position is reached for the first time during that operating period, the fill rate is then determined and the gate opening is adjusted accordingly. If the machine 100 has been running and the current charge material is received from the same batch as the last charge material, the gate member 130 is opened to the same full open gate position used to achieve the desired flow rate or fill rate in the last process run. The desired fill rate in the illustrated embodiment ranges over a desired band from a minimum desired fill rate of approximately 0.8 inches/second to a maximum desired fill rate of approximately 1 inch/second and is left unchanged from cycle to cycle. The default value of the desired fill rate is an input parameter, which can be changed by downloading from a PC, and the desired fill rate is also selectable by the control 142 (normally used for setting the gate full open position) when a corresponding control signal is generated locally or remotely from a control room. This selection appears as a range from 0 to 10 where the value 6 is the normally used default value.

Referring now to FIG. 5, the controller 104 is programmed to adjust the position of the gate member 130 until the fill rate is between 0.8 inches/second and 1.0 inch/second when the machine 100 is in the non-pinch mode. If the fill rate is too low, the controller 104 increases the opening of the gate member 130 by one position. A new fill rate is then determined. If the new fill rate is within the desired region, the controller 104 maintains the opening of the gate member 130 at the current position. If the new fill rate is still below the desired fill rate, the controller 104 increases the position of the gate member 130 by one more position. The entire process is repeated until the current fill rate falls within the desired region or the gate member 130 reaches its maximum full open position.

If the fill rate is higher than the desired fill rate, the controller 104 calculates a new position or new gate position that will produce the maximum fill rate of 1.0 inch/second. The calculation makes use of the flow rate corresponding to the opening of the gate member 130. Each of the 17 gate positions corresponds to the opening of the gate as shown in the table of FIG. 6 wherein the gate openings are expressed in flow opening percentages of the full open position of the gate. The opening percentages were empirically determined. As shown in FIG. 6, the exact flow opening is also dependent on whether the gate is a knife gate, such as the gate member 130, or a butterfly gate. To determine the new gate position that will yield the desired flow rate, the current gate position is converted to a flow opening percentage using the table in FIG. 6. The new gate position is then calculated by multiplying the flow opening by the maximum flow rate or maximum fill rate and dividing by the current fill rate with the resulting flow opening being converted to a gate opening position using the table of FIGS. 7A–7B, which are assembled as shown in FIG. 7C to form a complete table. The gate member 130 is then moved to the calculated gate opening position and a new flow rate is measured. The controller 104 continues to monitor the flow rate and continues the control of the gate member 130 to ensure that the current flow rate is or will be within the desired region.

If the fill rate is less than the desired fill rate, the gate member 130 is opened by one opening position and the controller 104 continues to monitor the flow rate and continues to control the gate member 130 to ensure that the current flow rate is within or will be within the desired region.

Figure 8:
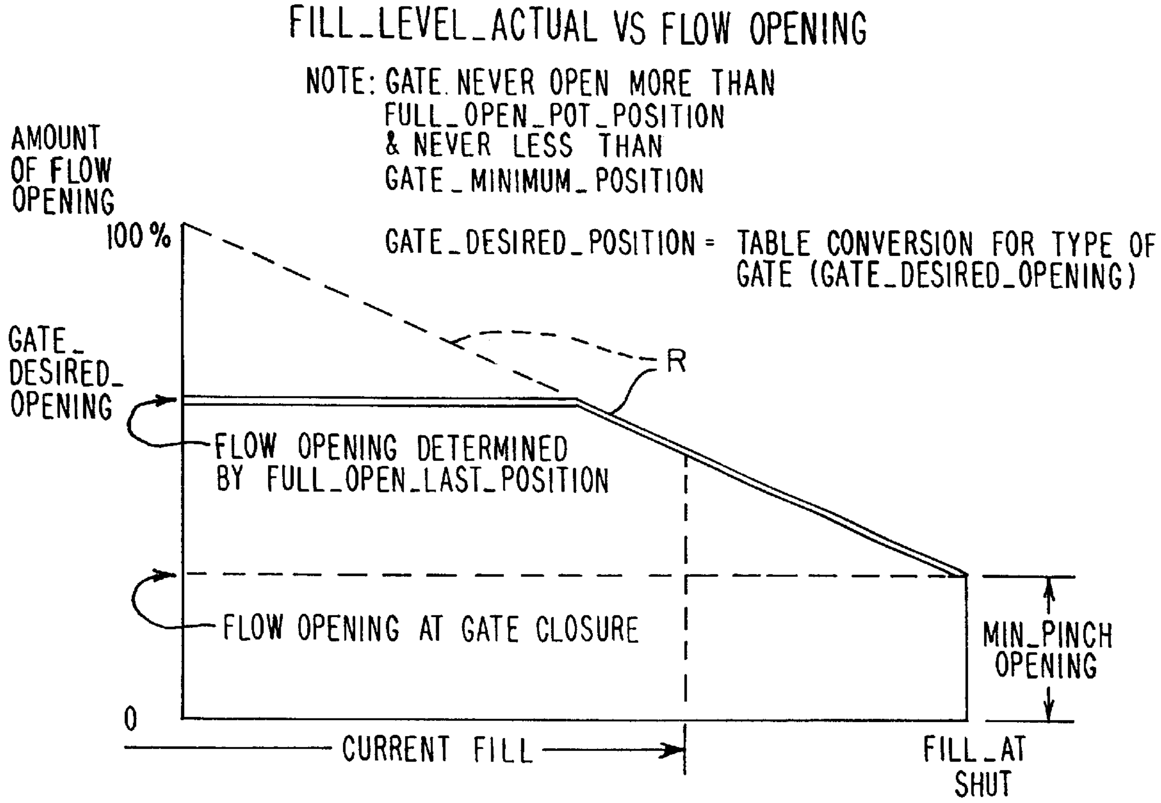
FIG. 8 is a graph of gate flow opening as a function of the actual fill level (Fill_Level_Actual) during a pinch mode portion of machine loading when the current rate of fill exceeds a minimum allowable rate.
Figure 9:
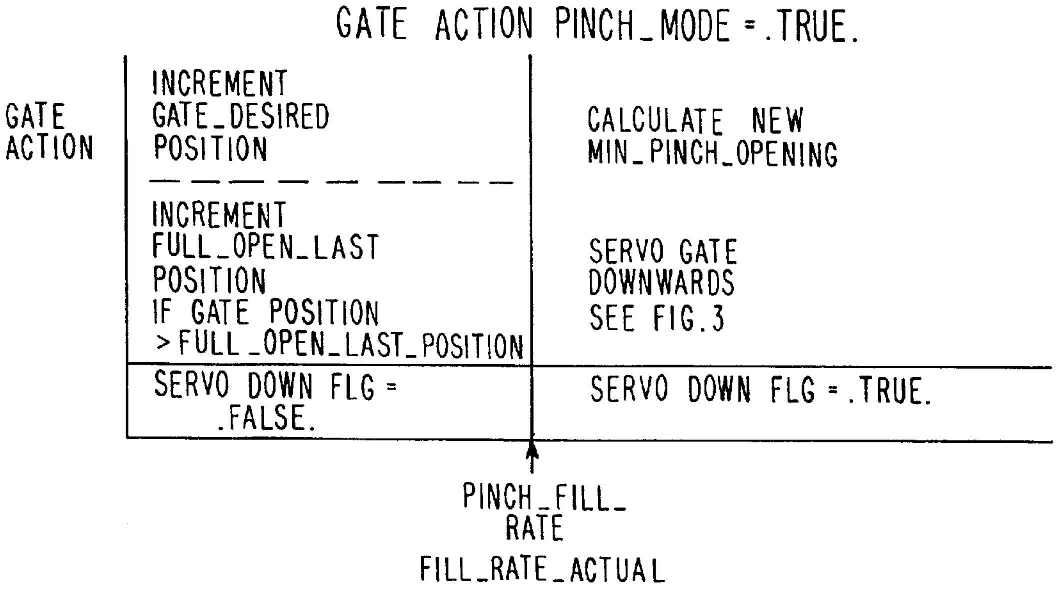
FIG. 9 illustrates different regions of gate control logic or gate action for basket loading as a function of the basket fill rate during a pinch mode portion of machine loading.

Referring now to FIGS. 8 and 9, the control process will now be described with respect to a pinch-off mode of operation. The pinch-off mode of operation is entered when the current fill level is equal to a pinch fill level. For example, the pinch fill level can be set equal to a percentage of the requested fill (Requested_Fill) level set by the control 140. For example, approximately 50% of the requested fill level. At this time, the current position of the gate member 130 is recorded as the gate full open last position, i.e., the last full open position (Full_Open_Last_Position), for use in processing the next portion of material to be processed by the machine 100 and the gate control action is now in a pinch mode. In the pinch mode, whether the gate opens wider or is moved toward a smaller opening is determined by the rate of charge wall build-up. As shown by FIG. 9, a desired minimum pinch fill rate establishes the demarcation between opening and closing. A desired minimum pinch fill rate is chosen as a percentage, or fraction of the desired fill rate during the full open position of the gate. For example, if the desired fill rate is 1" per second, a desired minimum pinch fill rate of ⅓" per second can be used.

As long as the rate of charge wall build-up is sufficient, i.e., greater than the desired minimum pinch fill rate (Pinch_Fill_Rate), a minimum pinch opening (Min_Pinch_Opening) is determined every fill rate sample period, i.e., every 0.8 seconds for the illustrated embodiment. The minimum pinch opening is calculated by taking the current gate flow opening, derived from the table of FIG. 6, which corresponds to the actual current gate position, multiplying the current gate flow opening by a desired minimum pinch fill rate and dividing the result by the current rate of wall build up. This calculated opening is then compared to a minimum allowed opening (Gate_Minimum_Position) or pinch gate opening, which is a constant for the machine. If the calculated minimum pinch opening is less than the minimum allowed opening, minimum pinch opening is set equal to the minimum allowed opening. Corresponding to the minimum pinch opening is a minimum pinch position obtained from the look-up table in FIG. 7 to convert flow opening into a gate position. The gate will be at the minimum pinch position, just prior to final gate closure.

As long as the rate of wall build-up is greater than the desired minimum pinch fill rate, the gate opening is controlled by reference to a linear range of gate openings R shown in FIG. 8. The linear range of gate openings R (servo gate) runs from the 100% flow opening to the minimum pinch opening. The current fill level, which is measured every 30 milliseconds during the pinch mode, is used to determine a flow opening value along the linear range of gate openings R which is then converted using the table shown in FIG. 7 to a gate position value. If the determined gate position value is greater than the Full_Open_Last_Position, the gate maintains its position at the Full_Open_Last_Position. Typically, the gate position determined using this procedure will eventually be less than the Full_Open_Last_Position (but not always since the minimum pinch opening may not require the gate to be moved below the Full_Open_Last_Position) and the gate moves to that position so that the gate is progressively closed substantially following the linear range of gate openings R until the minimum pinch opening is reached. At that time the gate shuts.

The gate position determined along the linear range of gate openings, R, (Servo Down Flg=TRUE.) as in FIG. 8, is determined by converting the gate's current position to a gate flow opening using the lookup table provided in FIG. 6. A minimum pinch opening is then computed by multiplying the gate flow opening by the pinch fill rate, and dividing the result by the current fill rate. The minimum pinch opening must always be greater than or equal to a minimum gate flow opening. The minimum pinch opening is set equal to the minimum gate flow opening if the minimum pinch opening is less than the minimum gate flow opening. This step ensures that there is a sufficient amount of charge material entering the basket. The slope R is then calculated by subtracting the minimum pinch opening from 100. A new gate position difference opening is calculated by dividing the slope R by a servo fill level multiplied by the result of the current fill level less the fill at shut level plus the servo fill level, e.g. (Slope/Servo Fill)×(Current Fill−Fill At Shut+Servo Fill) The gate desired opening (Gate_Desired_Opening) can now be determined by subtracting the gate position difference opening from 100. Finally, the gate desired opening (Gate_Desired_Opening) is converted to a new gate desired position (Gate_Desired_Position) using the lookup tables in FIG. 7.

With the above-described procedure, normally the gate positions are adjusted so that the charge wall build-up rate is held constant (Servo Down Flg=FALSE) until the gate positions are controlled along the linear range of gate openings R (Servo Down Flg =TRUE.) at which time the wall build-up rate is progressively and substantially linearly reduced in response to the determined current fill levels to reach the desired minimum pinch rate at the time of gate closure. However, because the holding tank may lose head, the rate of wall build-up may not be sufficient, being Lower than the desired minimum pinch fill rate. In this case, the gate is opened one gate position, provided the new gate position is not larger than the maximum allowed gate position set by the operator. Should the incremented gate position be higher than the Full_Open_Last_Position, the Full_Open_Last_Position is set to the new higher position value. The gate is held at the higher position value for one rate sample period, i.e., 0.8 seconds, and then the resulting new wall build-up rate determines the next course of action either holding the current gate position, increasing the gate position by one position or lowering the gate position in accordance with the above description made relative to FIG. 8.

Fill at shut is the fill level at which the gate member 130 will shut to terminate loading and determines the location along the fill line of the minimum pinch opening, see FIG. 8. It is equal to the requested load minus the fill during closing.

Figure 10:
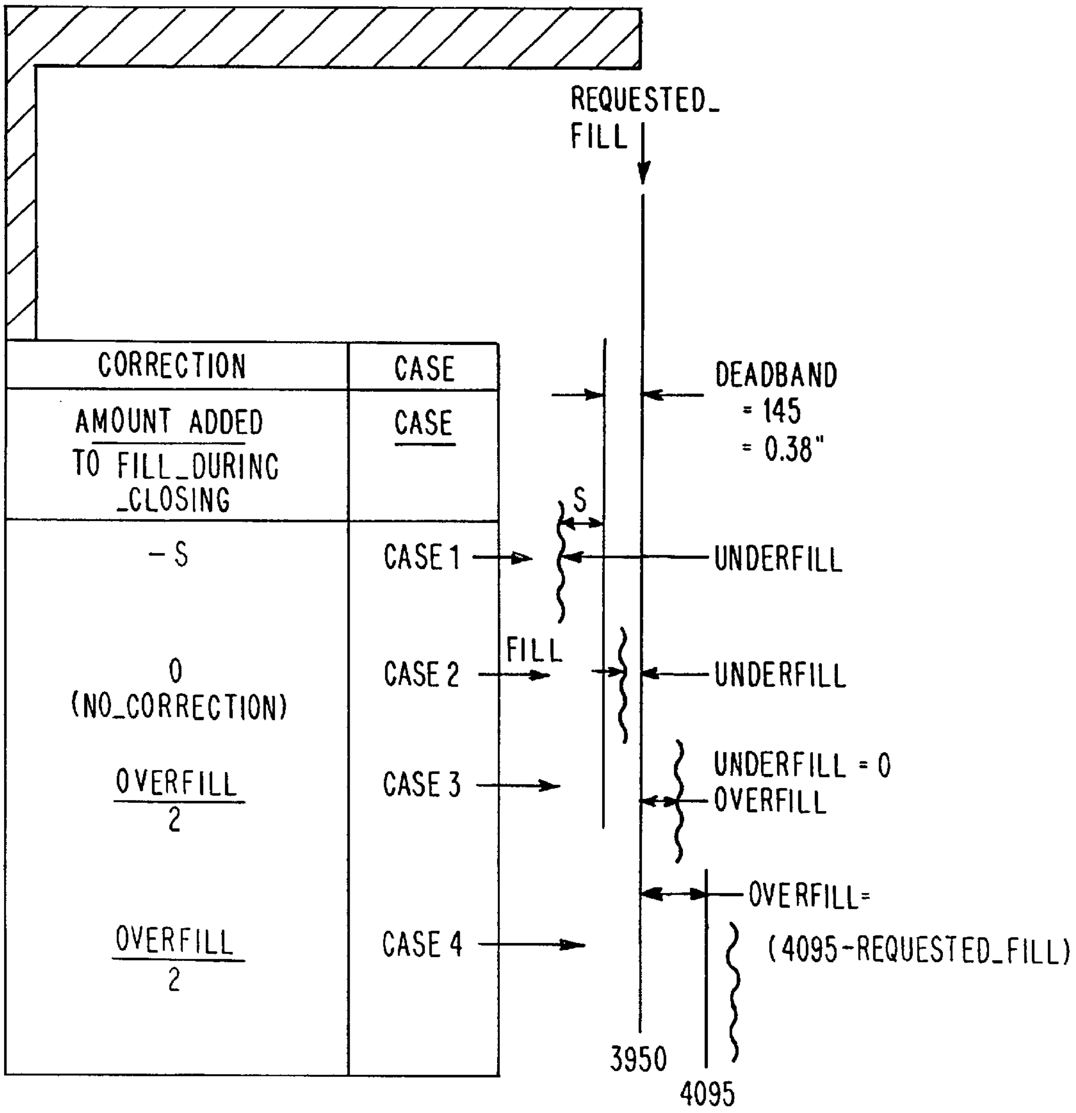
FIG. 10 illustrates corrections which are made to the Fill_During_Closing for operation in accordance with the present invention; and, FIGS. 11A and 11B illustrate operation of the present invention during basket wobble conditions.

Corrections to the fill during closing is determined as shown in FIG. 10 with the fill during closing as shown in FIG. 3, being used to determine the fill at shut point along the current fill line of FIG. 8. Three consecutive underfills must occur before a correction is made to the fill during closing while overfills are corrected upon the first overfill. The requested fill level comprises a deadband ranging between a desired minimum fill level and a desired maximum fill level, i.e., the requested fill level level as shown in FIG. 10. Thus, any fill over the requested fill value is corrected by reducing the fill during closing by the overfill amount divide by 2; and, after three consecutive underfills each underfill being less than the minimum requested fill level, or less than the requested fill level minus the deadband, the value of the fill during closing is increased by an amount based on the minimum underfill of the three consecutive underfills.

Having described the invention in detail and by reference to preferred embodiments thereof, it will be apparent that modifications and variations are possible without departing from the scope of the invention defined in the appended claims.

What is claimed is:

1. A method for controlling a centrifugal machine comprising the steps of:

opening a gate of said centrifugal machine to an initial one of a plurality of gate positions between a full closed position and a full open position for entry of charge material into a rotating centrifugal basket of said centrifugal machine;

measuring a charge wall thickness forming along inner sidewalls of said rotating centrifugal basket;

determining a fill rate at which said charge material enters said rotating centrifugal basket;

comparing said determined fill rate to a desired fill rate;

opening said gate towards its full open position if said fill rate is less than said desired fill rate;

closing said gate towards its full closed position if said fill rate is greater than said desired fill rate so that charge material enters said rotating centrifugal basket at substantially said desired fill rate and controlling the closure of said gate to gradually approach a desired minimum flow rate.

2. A method for controlling a centrifugal machine as claimed in claim 1 wherein said desired fill rate comprises a range of fill rates extending from a desired minimum fill rate to a desired maximum fill rate said steps of opening and closing said gate comprises, respectively, the steps of:

opening said gate towards its full open position if said fill rate is less than said desired minimum fill rate; and closing said gate towards its full closed position if said fill rate is greater than said desired maximum fill rate.

3. A method for controlling a centrifugal machine as claimed in claim 2 further comprising the steps of:

comparing said determined fill rate to said desired minimum fill rate and said desired maximum fill rate;

incrementing said gate by one position towards said full open position if said determined fill rate is less than said desired minimum fill rate;

closing said gate towards said full closed position by at least one position if said fill rate exceeds said desired maximum fill rate; and maintaining said gate position if said determined fill rate is equal to or exceeds said desired minimum fill rate and is less than or equal to said desired maximum fill rate.

4. A method for controlling a centrifugal machine as claimed in claim 3 wherein said step of closing said gate comprising the steps of:

converting said gate's current position to a gate flow opening;

computing a gate desired opening by multiplying said gate flow opening by said desired fill rate with the result being divided by said determined fill rate; and converting said gate desired opening to a new gate position.

5. A method for controlling a centrifugal machine as claimed in claim 2 further comprising the step of selecting a desired minimum fill rate of 0.8 inches per second, and a desired maximum fill rate of 1.0 inches per second.

6. A method for controlling a centrifugal machine as claimed in claim 1 further comprising the step of selecting said initial one of said plurality of gate positions to be a percentage of said full open position.

7. A method for controlling a centrifugal machine as claimed in claim 6 further comprising the step of setting said percentage to 15% of said full open position.

8. A method for controlling a centrifugal machine as claimed in claim 6 further comprising the step of setting said percentage to 33% of said full open position.

9. A method for controlling a centrifugal machine as claimed in claim 1 further comprising the step of recording a gate full open last position for use in processing the next batch of charge material.

10. A method for controlling a centrifugal machine as claimed in claim 9 further comprising the step of recording said gate full open last position immediately prior to entering a pinch mode of operation of said centrifugal machine.

11. A method for controlling a centrifugal machine as claimed in claim 10 further comprising the step of:

modifying said recorded gate full open last position if said gate opens towards its full open position after recording said gate full open last position.

12. A method for controlling a centrifugal machine as claimed in claim 9 further comprising the steps of:

opening said gate to a fraction of said full open position if the current cycle of centrifugal processing is the first cycle immediately following a power up or reset condition, otherwise opening said gate to said gate full open last position recorded in an immediately preceding previous cycle of centrifugal processing; and maintaining said gate position until the thickness of charge material in said rotating centrifugal basket of said centrifugal machine exceeds a desired minimum load level.

13. A method for controlling a centrifugal machine as claimed in claim 1 further comprising the step of determining said fill rate every 0.8 seconds.

14. A method for controlling a centrifugal machine as claimed in claim 1 wherein said step of measuring a charge wall thickness forming along inner side walls of said rotating centrifugal basket is performed every 30 milliseconds.

15. A method for controlling a centrifugal machine as claimed in claim 1 wherein said step of measuring a charge wall thickness forming along inner sidewalls of said rotating centrifugal basket of said centrifugal machine comprises the step of using an ultrasonic probe.

16. A method for controlling a centrifugal machine as claimed in claim 1 further comprising the step of closing said gate towards said full closed position if wobble in said centrifugal basket exceeds a severity threshold.

17. A method for controlling a centrifugal machine as claimed in claim 16 further comprising the steps of:

maintaining a wobble severity count of consecutive occurrences of gate closure due to detected wobble;

comparing said wobble severity count to a maximum severity count;

if said severity count exceeds said maximum severity count performing the steps of:

closing said gate to said full closed position;

adjusting rotation speed of said centrifugal basket of said centrifugal machine to a minimum speed necessary to to keep the bulk of charge in a walled up position; and initiating an alarm signal if said gate fully closes due to wobble.

18. A method for controlling a centrifugal machine as claimed in claim 1 further comprising the step of closing said gate towards its closed position if wobble in said centrifugal basket exceeds a severity threshold and a fill level exceeds a desired minimum load level.

19. A method for controlling a centrifugal machine as claimed in claim 18 further comprising the steps of:

closing said gate towards said full closed position if wobble in said centrifugal basket of said centrifugal machine exceeds a maximum severity count, and said fill level exceeds said desired minimum load level;

adjusting the speed of rotation of said centrifugal basket of said centrifugal machine to a minimum speed necessary to to keep the bulk of charge in a walled up position; and initiating an alarm signal if said gate fully closes due to wobble.

20. A method for controlling a centrifugal machine as claimed in claim 1 wherein said step of measuring a charge wall thickness forming along inner side walls of said rotating centrifugal basket is preformed every 60 milliseconds.

21. A method for controlling a centrifugal machine as claimed in claim 1 further comprising the steps of:

detecting unstabilizing wobble of said centrifugal basket; and if said unstabilizing wobble of said centrifugal basket is detected, closing said gate to a new gate position computed by determining a gate flow opening, decreasing said determined gate flow opening by 20%, and converting said gate flow opening to said new gate position, said gate closing by at least 1 position.

22. A method for controlling a centrifugal machine as claimed in claim 1 further comprising the steps of:

closing said gate to a position computed by determining a gate flow opening, decreasing said gate flow opening by 20%, and converting said gate flow opening to a new gate position, said gate closing by at least 1 position, if wobble in said centrifugal basket exceeds a severity threshold and said charge wall thickness exceeds a desired minimum load level;

closing said gate to said full closed position if wobble of said centrifugal basket of said centrifugal machine exceeds a maximum severity count and said charge wall thickness exceeds said desired minimum load level;

adjusting the speed of rotation of said centrifugal basket of said centrifugal machine to a minimum speed necessary to to keep the bulk of charge in a walled up position; and initiating an alarm signal if said gate fully closes due to wobble.

23. A method for controlling a centrifugal machine as claimed in claim 1 further comprising the step of monitoring negative apparent feed rates to detect wobble of said centrifugal basket.

24. A method for controlling a centrifugal machine as claimed in claim 23 further comprising the step of disabling said wobble detection for a loading cycle if an operator changes said gate full open position.

25. A method for controlling a centrifugal machine as claimed in claim 1 further comprising the step of recording said charge wall thickness and said fill rate subsequent to said gate closing.

26. A method for controlling a centrifugal machine as claimed in claim 25 further comprising the step of determining a wash time for said charge material based upon said charge wall thickness recorded subsequent to said gate closing.

27. A method for controlling a centrifugal machine as claimed in claim 1 further comprising the step of providing an operator reset for said centrifugal machine.

28. A method for controlling a centrifugal machine as claimed in claim 1 further comprising the step of providing an operator means for controlling said desired fill rate.

29. A method for controlling a centrifugal machine as claimed in claim 1 further comprising the step of providing an operator means for controlling said gate full open position.

30. A method for controlling a centrifugal machine comprising the steps of:

opening a gate of said centrifugal machine to an initial one of a plurality of gate positions between a full closed position and a full open position for entry of charge material into a rotating centrifugal basket of said centrifugal machine;

measuring a charge wall thickness forming along inner sidewalls of said rotating centrifugal basket;

determining a fill rate at which said charge material enters said rotating centrifugal basket;

comparing said determined fill rate to a desired fill rate;

opening said gate towards its full open position if said fill rate is less than said desired fill rate;

closing said gate towards its full closed position if said fill rate is greater than said desired fill rate so that charge material enters said rotating centrifugal basket at substantially said desired fill rate;

comparing said charge wall thickness to a desired pinch fill level;

entering a pinch mode of machine operation upon said charge wall thickness being equal to or greater than said desired pinch fill level;

moving said gate from its current position towards a minimum pinch gate opening position while in said pinch mode of machine operation; and maintaining said pinch mode of machine operation until said charge wall thickness reaches a fill at shut level.

31. A method for controlling a centrifugal machine as claimed in claim 30 further comprising the step of selecting said minimum pinch gate opening to be a percentage of said full open position.

32. A method for controlling a centrifugal machine as claimed in claim 30 wherein said step of moving said gate from its current position towards said minimum pinch gate opening comprises the step of substantially linearly moving said gate from its current position towards said minimum pinch gate opening.

33. A method for controlling a centrifugal machine as claimed in claim 30 further comprising the step of selecting said desired pinch fill level to be a percentage of a requested fill level.

34. A method for controlling a centrifugal machine as claimed in claim 33 further comprising the step of selecting said desired pinch fill level to be 50% of said requested fill level.

35. A method for controlling a centrifugal machine as claimed in claim 30 further comprising the steps of:

comparing said determined fill rate to a desired pinch fill rate;

incrementing said gate by one position towards said full open position if said determined fill rate is less than said desired pinch fill rate;

closing said gate substantially linearly by moving said gate from its current position towards said minimum pinch gate opening if said fill rate is greater than said desired pinch fill rate; and maintaining said gate in its current position if said determined fill rate is substantially equal to said desired pinch fill rate.

36. A method for controlling a centrifugal machine as claimed in claim 35 wherein said desired pinch fill rate comprises a range of pinch fill rates extending from a desired minimum pinch fill rate to a desired maximum pinch fill rate.

37. A method for controlling a centrifugal machine as claimed in claim 35 wherein said step of closing said gate substantially linearly by moving said gate from its current position towards said minimum pinch gate opening comprises the steps of:

converting said gate's current position to a gate flow opening;

computing a minimum pinch opening by multiplying said gate flow opening by said pinch fill rate divided by said determined fill rate;

setting said minimum pinch opening to a minimum gate flow opening if said minimum pinch opening is less than said minimum gate flow opening;

calculating a slope by subtracting said minimum pinch opening from 100;

calculating a gate position difference opening using said slope;

calculating a gate desired opening by subtracting said gate position difference opening from 100; and converting said gate desired opening to a new gate position.

38. A method for controlling a centrifugal machine as claimed in claim 37 wherein said step of calculating said gate position difference opening comprises the step of dividing said slope by a servo fill level with the result being multiplied by the result of said determined fill level less said fill at shut level and plus said servo fill level.

39. A method for controlling a centrifugal machine as claimed in claim 35 further comprising the step of selecting said desired pinch fill rate to be a percentage of said desired fill rate.

40. A method for controlling a centrifugal machine as claimed in claim 35 further comprising the step of setting said percentage to 33% of said desired fill rate.

41. A method for controlling a centrifugal machine as claimed in claim 30 further comprising the step of moving said gate to its fully closed position upon said charge wall thickness reaching said fill at shut level.

42. A method for controlling a centrifugal machine as claimed in claim 41 further comprising the step of selecting said fill at shut to be a percentage of a requested fill level.

43. A method for controlling a centrifugal machine as claimed in claim 41 further comprising the steps of:

comparing a final measured charge wall thickness to a requested fill level;

increasing said fill at shut level if said charge wall thickness is less than a requested minimum fill level; and decreasing said fill at shut level if said charge wall thickness is greater than a requested maximum fill level.

44. A method for controlling a centrifugal machine as claimed in claim 41 further comprising the steps of:

comparing a final measured charge wall thickness to a requested fill level to determine underfill or overfill of said centrifugal basket;

increasing said fill at shut level if said centrifugal basket is underfilled for at least one cycle of centrifugal processing; and decreasing said fill at shut level if said centrifugal basket is overfilled for at least one cycle of centrifugal processing.

45. A method for controlling a centrifugal machine as claimed in claim 44 wherein said step of increasing said fill at shut level if said centrifugal basket is underfilled for at least one cycle of centrifugal processing comprises the step of increasing said fill at shut level if said centrifugal basket is underfilled for three consecutive cycles of centrifugal processing.

46. A method for controlling a centrifugal machine as claimed in claim 45 wherein said step of increasing said fill at shut level if said centrifugal basket is underfilled for three consecutive cycles of centrifugal processing comprises the step of increasing said fill at shut level by an amount equal to the minimum underfill of said three consecutive cycles of centrifugal processing.

47. A method for controlling a centrifugal machine as claimed in claim 44 wherein said step of decreasing said fill at shut level if said centrifugal basket is overfilled for at least one cycle of centrifugal processing comprises the step of decreasing said fill at shut level by an amount equal to one half the difference between said final charge wall thickness and said requested fill.

48. A method for controlling a centrifugal machine comprising the steps of:

opening a gate of said centrifugal machine to an initial one of a plurality of gate positions between a full closed position and a full open position for entry of charge material into a rotating centrifugal basket of said centrifugal machine;

measuring a charge wall thickness forming along inner sidewalls of said rotating centrifugal basket;

determining a fill rate at which said charge material enters said rotating centrifugal basket;

comparing said determined fill rate to a desired fill rate;

opening said gate towards its full open position if said fill rate is less than said desired fill rate;

closing said gate towards its full closed position if said fill rate is greater than said desired fill rate so that charge material enters said rotating centrifugal basket at substantially said desired fill rate; and closing said gate towards said full closed position in response to sensing an unstabilizing wobble of said centrifugal basket.

49. A method for controlling a centrifugal machine as claimed in claim 48 further comprising the step of requiring at least two sample periods to determine wobble.

50. A method for controlling a centrifugal machine as claimed in claim 48 further comprising the step of disabling said unstabilizing wobble sensing until said charge wall thickness exceeds a minimum load level.

51. A method for controlling a centrifugal machine comprising the steps of:

opening a gate of said centrifugal machine to an initial one of a plurality of gate positions between a full closed position and a full open position for entry of charge material into a rotating centrifugal basket of said centrifugal machine;

measuring a charge wall thickness forming along inner sidewalls of said rotating centrifugal basket;

comparing said charge wall thickness to a desired pinch fill level;

entering a pinch mode of machine operation upon said charge wall thickness being equal to or greater than said desired pinch fill level; and moving said gate from its current position towards a minimum pinch gate opening position while in said pinch mode of machine operation by determining a fill rate at which said charge material enters said rotating centrifugal basket; comparing said determined fill rate to a desired pinch fill rate; and moving said gate incrementally through a linear range of gate openings towards said gate full closed position if said fill rate exceeds said pinch fill rate;

comparing said charge wall thickness to a fill at shut level; and maintaining said pinch mode of machine operation until said charge wall thickness reaches said fill at shut level.

52. A method for controlling a centrifugal machine as claimed in claim 51 further comprising the step of moving said gate to said full closed position upon said charge wall thickness reaching said fill at shut level.

53. A method for controlling a centrifugal machine as claimed in claim 51 wherein said step of moving said gate from its current position towards said minimum pinch gate opening comprises the step of substantially linearly moving said gate from its current position towards said minimum pinch gate opening.

54. A method for controlling a centrifugal machine as claimed in claim 53 wherein said step of substantially linearly moving said gate from its current position towards said minimum pinch gate opening further comprises the steps of:

determining a fill rate at which said charge material enters said rotating centrifugal basket;

converting said gate's current position to a gate flow opening;

computing a minimum pinch opening by multiplying said gate flow opening by a desired pinch fill rate divided by said determined fill rate;

setting said minimum pinch opening to a minimum gate flow opening if said minimum pinch opening is less than said minimum gate flow opening;

calculating a slope by subtracting said minimum pinch opening from 100;

calculating a gate position difference opening using said slope;

calculating a gate desired opening by subtracting said gate position difference opening from 100; and converting said gate desired opening to a new gate position.

55. A method for controlling a centrifugal machine as claimed in claim 54 wherein said step of calculating said gate position difference opening comprises the step of dividing said slope by a servo fill level with the result being multiplied by the result of said determined fill level less said fill at shut level and plus said servo fill level.

56. A method for sensing unstabilizing wobble of a rotating centrifugal basket of a centrifugal machine comprising the steps of:

opening a gate of said centrifugal machine to an initial one of a plurality of gate positions between a full closed position and a full open position for entry of charge material into said rotating centrifugal basket of said centrifugal machine;

measuring a charge wall thickness forming along inner sidewalls of said rotating centrifugal basket;

determining an apparent feed rate at which charge material enters said rotating centrifugal basket;

detecting oscillations in said apparent feed rate; and closing said gate towards said full closed position in response to detecting said oscillations in said apparent feed rate.

57. A method for sensing an unstabilizing wobble as claimed in claim 56 wherein said step of closing said gate towards said full closed position further comprising the step of closing said gate towards said full closed position if said unstabilizing wobble in said centrifugal basket exceeds a severity threshold.

58. A method for sensing an unstabilizing wobble as claimed in claim 57 further comprising the steps of:

maintaining a wobble severity count of consecutive occurrences of gate closure due to detected wobble;

comparing said wobble severity count to a maximum severity count;

if said severity count exceeds said maximum severity count performing the steps of:

closing said gate to said full closed position;

adjusting rotation speed of said centrifugal basket of said centrifugal machine to a minimum speed necessary to to keep the bulk of charge in a walled up position; and initiating an alarm signal if said gate fully closes due to wobble.

59. A method for sensing an unstabilizing wobble as claimed in claim 57 wherein said step of closing said gate further comprises the step of closing said gate towards said full closed position if wobble in said centrifugal basket exceeds said severity threshold and said measured charge wall thickness exceeds a desired minimum load level.

60. A method for sensing an unstabilizing wobble as claimed in claim 59 further comprising the steps of:

maintaining a wobble severity count of consecutive occurrences of gate closure due to detected wobble;

comparing said wobble severity count to a maximum severity count;

if said severity count exceeds said maximum severity count performing the steps of:

closing said gate to said full closed position;

adjusting rotation speed of said centrifugal basket of said centrifugal machine to a minimum speed necessary to to keep the bulk of charge in a walled up position; and initiating an alarm signal if said gate fully closes due to wobble.

61. A method for sensing an unstabilizing wobble as claimed in claim 56 wherein said step of measuring a charge wall thickness forming along inner sidewalls of said rotating centrifugal basket comprises the step of periodically sampling said charge wall thickness, said method further comprising the step of requiring at least two sample periods to determine unstabilizing wobble.

62. A method for sensing an unstabilizing wobble as claimed in claim 56 further comprising the step of disabling wobble sensing until said measured charge wall thickness exceeds a minimum load level.

63. A method for sensing an unstabilizing wobble as claimed in claim 56 wherein said step of closing said gate further comprises the step of closing said gate to a new gate position computed by determining a gate flow opening, decreasing said determined gate flow opening by 20%, and converting said gate flow opening to determine said new gate position, said gate closing by at least 1 position.

64. A method for sensing an unstabilizing wobble as claimed in claim 63 wherein said step of closing said gate further comprises the step of closing said gate by at least one gate position.

65. A method for sensing an unstabilizing wobble as claimed in claim 56 wherein said step of closing said gate further comprises the steps of:

closing said gate to a position computed by determining a gate flow opening, decreasing said gate flow opening by 20%, and converting said gate flow opening to determine said new gate position, said gate closing by at least 1 position, if wobble in said centrifugal basket is greater than a severity threshold, a maximum severity count has not been exceeded, and said measured charge wall thickness exceeds a desired minimum load level;

closing said gate to said full closed position if said unstabilizing wobble exceeds said maximum severity count and said measured charge wall thickness exceeds said desired minimum load level;

adjusting the speed of rotation of said centrifugal basket of said centrifugal machine to a minimum speed necessary to to keep the bulk of charge in a walled up position; and initiating an alarm signal if said gate fully closes due to wobble.

66. A method for sensing an unstabilizing wobble as claimed in claim 65 wherein said step of closing said gate further comprises the step of closing said gate by at least one gate position.

67. A method for sensing an unstabilizing wobble as claimed in claim 56 further comprises the step of monitoring negative apparent feed rates to detect wobble of said centrifugal basket.

68. A method for sensing an unstabilizing wobble as claimed in claim 56 further comprising the step of disabling wobble sensing for a loading cycle if an operator changes said gate full open position.

* * * * *

UNITED STATES PATENT AND TRADEMARK OFFICE

CERTIFICATE OF CORRECTION

PATENT NO. : 6,296,774 B1
DATED : October 2, 2001
INVENTOR(S) : Donald John Henkel and David John Tack It is certified that error appears in the above-identified patent and that said Letters Patent is hereby corrected as shown below:

Column 9,
Line 67, "basket even through" should be -- basket even though --

Column 13,
Line 21, "(Servo Down Flg=FALSE)" should be -- (Servo Down Flg=.FALSE.) --

Column 21,
Lines 12, 13, 33 and 34, "to to keep the bulk" should be -- to keep the bulk --

Column 22,
Line 30, "to to keep the bulk" should be -- to keep the bulk --

Signed and Sealed this

Thirtieth Day of April, 2002

*Attest:*

*Attesting Officer*

JAMES E. ROGAN
*Director of the United States Patent and Trademark Office*